United States Patent [19]

Nagae

[11] 4,402,140
[45] Sep. 6, 1983

[54] TELESCOPE WITH COMPASS

[76] Inventor: Shoichi Nagae, 7, Yokohama-cho, Matsue-shi, Shimane-ken, Japan

[21] Appl. No.: 856,947

[22] Filed: Dec. 2, 1977

[51] Int. Cl.³ .................... G01C 17/18; G01C 17/24
[52] U.S. Cl. ............................. 33/272; 33/334; 33/348; 33/364
[58] Field of Search ............ 33/1 L, 1 T, 1 DD, 267, 33/272, 273, 275 R, 275 G, 333, 334, 348, 354, 363, 364; 356/247, 253, 254

[56] References Cited

U.S. PATENT DOCUMENTS

| Re. 26,109 | 11/1966 | Brown | 33/364 |
| 2,792,742 | 5/1957 | Scott et al. | 33/1 L |
| 2,941,307 | 6/1960 | Frisbie | 33/364 |
| 3,128,562 | 4/1964 | Yusa | 33/364 |
| 3,417,474 | 12/1968 | Evans et al. | 33/275 G |
| 3,448,623 | 6/1969 | Fischer | 33/275 G |
| 4,020,559 | 5/1977 | Sherman | 33/272 |

FOREIGN PATENT DOCUMENTS

| 594238 | 3/1934 | Fed. Rep. of Germany | 33/348 |
| 1293808 | 10/1972 | United Kingdom | 33/272 |

*Primary Examiner*—Richard R. Stearns
*Attorney, Agent, or Firm*—James Creighton Wray

[57] ABSTRACT

Disclosed is a structure of a telescope with compass which indicates the direction in which the telescope is pointed, at the periphery of the field of vision of the telescope. Referring to the compass used for the telescope: a magnet is provided in a compass direction indicating globe on whose outer circumference directions are indicated. This direction indicating globe is supported so as to float in a case containing a lubricating liquid such as oil, etc. This compass is attached to the body of the telescope (specifically, a pair of hand-held binoculars, etc.). Then, the compass direction indication of the direction indicating globe appears as an image at the same focal point as the focal point of the objective lens of the telescope. Referring to other forms of telescopes: the direction indication is especially applicable to a telescope attached to a stand. A gyrocompass fixed to the arms supporting the body tube is connected to a luminous diode or crystalline liquid indication means, etc. attached inside the body tube of the telescope by a conductor. The gyrocompass, because it is fixed to the arms, pivots with the body tube of the telescope. A signal of the gyrocompass which detects the direction in which the telescope is pointed, is indicated at the luminous diode indication means, etc. in the body tube through the conductor. Finally, this direction indication is perceived by the viewer through the ocular at the periphery of the field of vision of the telescope.

5 Claims, 13 Drawing Figures

HORIZONTAL PLANE

TELESCOPE WITH COMPASS

BACKGROUND OF THE INVENTION (1) Field of the Invention

The present invention relates to a telescope in whose lumen the compass direction of the object at which the telescope is pointed is indicated.

(2) Description of the Prior Art

Previously, in order to determine the compass direction of an object perceived in the telescope, it was necessary to use a separate compass. Therefore, not only was the operation exceedingly complicated, but also an error in observation could be easily made. Furthermore, if the object moves at high speed, it is extremely difficult to determine the compass direction simultaneously.

BRIEF SUMMARY OF THE INVENTION (1) A hand-held telescope is provided with a compass whose direction indicating portion always maintains a constant angle to the ground, regardless of whether the body tube of the telescope is moved in a vertical direction to any degree. In order to direct to the ocular the image of the direction detected by this compass, a member is provided between the objective lens and the ocular lens of the telescope. This telescope indicates within the field of vision the compass direction in which the telescope is pointed.

(2) A telescope provided on a stand has a gyrocompass which is attached to the arms supporting the body tube. The indication of the gyrocompass appears at the luminous diode indication means, or a crystalline liquid indication means, etc., mounted in the body tube of the telescope through a conductor in the body tube of the telescope. The gyrocompass is provided at the arms which support the body tube and moves in the same direction as the body tube. Therefore, the compass direction in which the body tube of the telescope is pointed is indicated.

(3) In a telescope provided on a stand, the direction is indicated in the finder by the card-surface of a large magneto-compass at the arms supporting the body tube of the telescope. The card surface of the magneto-compass is detected by a fiberscope whose opposite end leads into the body tube of the telescope.

OBJECTS OF THE INVENTION (1) It is therefore an object of the invention to provide a simple structured telescope which gives a magnified image of the object and its direction simultaneously.

(2) It is another object of the invention to provide a compact and portable telescope which gives a magnified image of the external view and its accurate direction regardless of whether the body tube is moved in a vertical direction. In this compact telescope, particularly one which is held by hand, a type of compass is provided which always maintains a constant angle to the ground, even if the angle of the body tube is changed in a vertical direction to any degree.

(3) It is still another object of the invention to provide particularly a telescope on a stand which gives a precise, magnified image of the object and an accurate direction in which the telescope is pointed simultaneously. This is accomplished by using a luminous diode or other indication means.

(4) It is a further object of the invention to provide relatively large telescope which is portable and seldom malfunctions, and which gives a magnified image of the external view and its direction. This telescope uses a magneto-compass and a fiberscope.

(5) It is a still further object of the invention to provide a telescope which can show the direction in which it is pointed not only within the field of vision in the telescope, but also from the outside by attaching a transparent case containing a compass to the telescope.

Other and further objects, features and advantages of the invention will appear more fully from the following description.

DETAILED DESCRIPTION OF PREFERRED EMBODIMENTS

Figure 1:
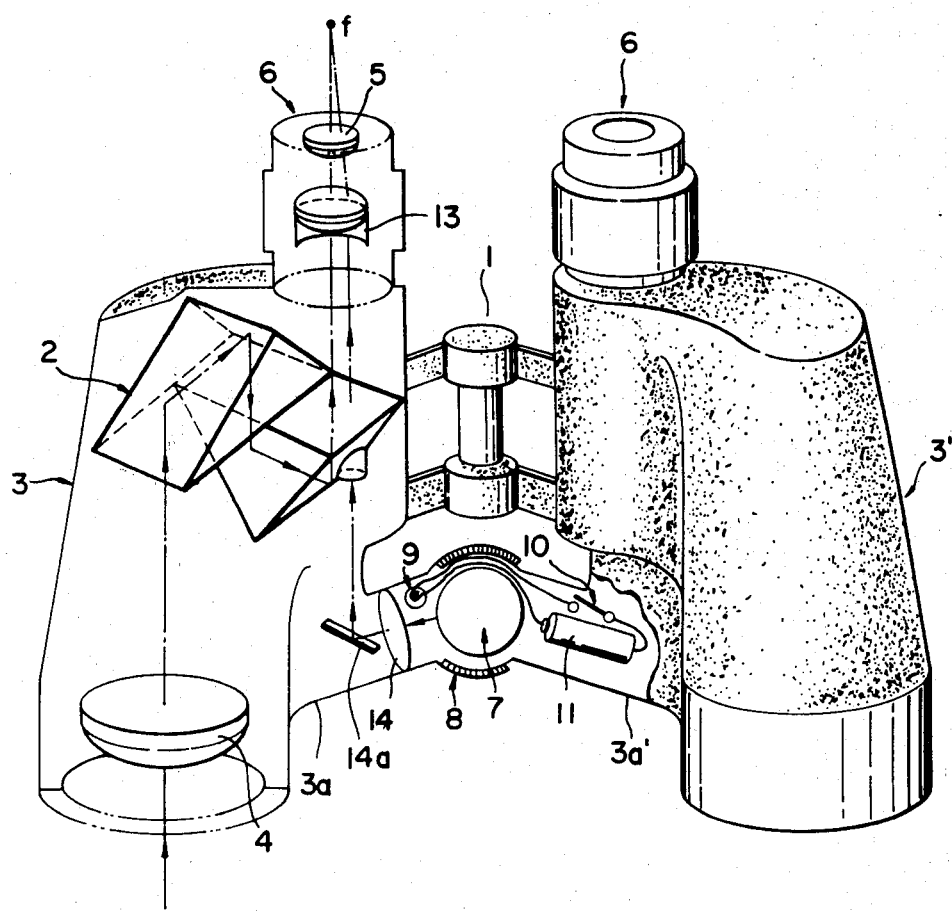
FIG. 1 is a partially sectioned perspective view of a pair of binoculars with an attached immersion compass.

FIGS. 1 through 6 in combination show the first embodiment of the invention. The pair of binoculars 1 shown in this embodiment is provided with Porro prisms 2 in the right and left body tubes 3,3'. Incident light through an objective lens 4 is reflected four times in the Porro prism 2 and results in an erect image at the focal point f.

Reference numeral 5 denotes an ocular which is placed in a finder 6. A case 8 for containing a compass 7 is formed on the side surface of the body tube 3. A lamp 9 for illuminating the compass 7 is provided in the case 8.

The case 8 is formed at the tips of the hollow arms 3a,3a' extending from the right and left body tubes 3,3'. The tips of the arms 3a,3a' are respectively formed in hemispherical shapes. These hemispherical portions are fit together so as to be movable. Thus when the pair of binoculars 1 is bent, the arms 3a,3a' pivot centering around these hemispherical portions, and the pair of binoculars 1 functions smoothly. More specifically, the arms 3a, 3a' function as a freely rotatable universal joint, centering around the hemispherical portions.

A lamp 9 is connected to a power source 11, such as a mercury battery etc., through a switch 10. A small rectangular prism 12 is provided at a part of the reflecting surface of the Porro prism 2. Then an image of the compass 7 is formed at the focal point f through the objective lens 14, a reflector 14a, the small rectangular prism 12, an ocular 13, and the ocular 5.

Figure 2:
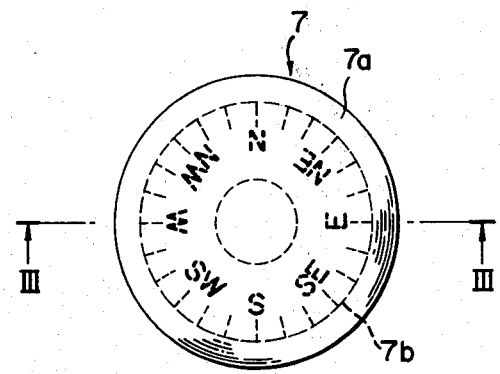
FIG. 2 is a top plan view of an immersion compass.
Figure 3:
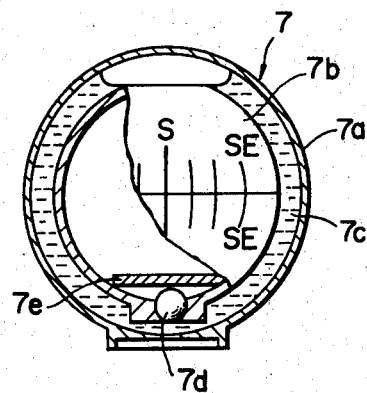
FIG. 3 is a sectional view of an immersion compass taken along the lines III to III in FIG. 2 incorporating a partially cut away section of a compass direction indicating globe.
Figure 4:
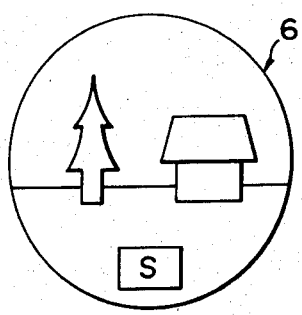
FIG. 4 is a schematic illustration showing the manner of direction indication within the field of vision of the telescope.
Figure 5:
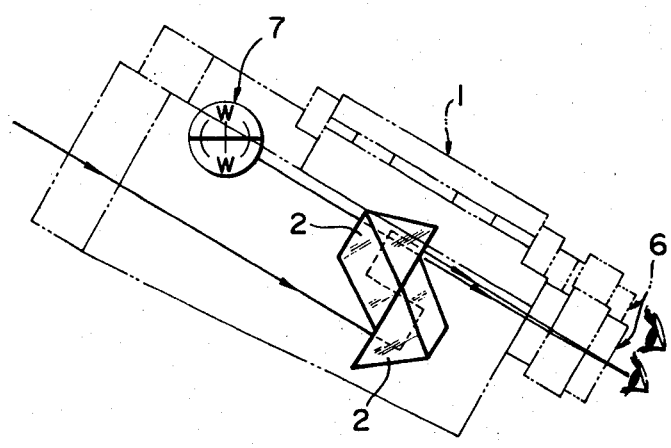
FIG. 5 is a schematic illustration showing the condition of a compass direction indicating globe when a pair of binoculars is inclined.
Figure 6:
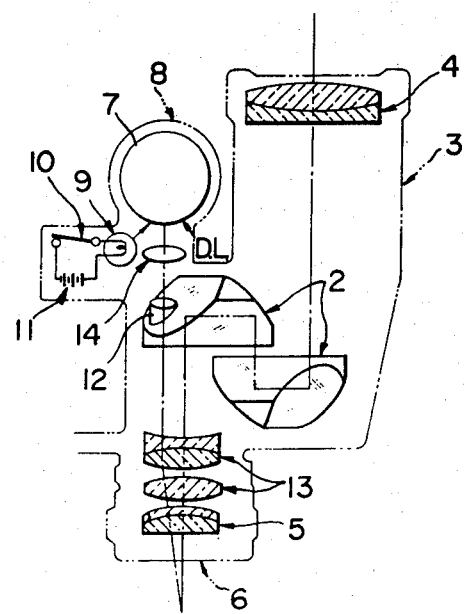
FIG. 6 is a plan view explaining the principles and structure of the pair of binoculars shown in FIG. 1.

The compass 7 is a so-called "immersion type magneto-compass," which is comprised of a hollow, spherical case 7a and a compass direction indicating globe 7b as shown in FIGS. 2 and 3. The compass direction indicating globe 7b contained in the spherical case 7a floats in a liquid 7c, such as oil, etc. so as to rotate. Reference numeral 7e designates a bar magnet which rotates the compass direction indicating globe by responding to the terrestrial magnetism. Compass direction indications are described on the surface of the direction indicating globe 7b from the top of the globe down. Therefore, even if the body tubes 3,3' are inclined at an angle to the ground, as shown in FIG. 5, the direction indication can be read because of a weight 7d and the weight of the bar magnet 7e provided in the bottom portion of the globe 7b.

In addition, the compass direction indication of the immersion compass 7 can be illuminated not only by the lamp 9, but also by external light D.L. Due to the introduction of external light, the lamp 9 can be turned on only when required, for example at night, thus consumption of the battery 11 can be minimized. In this case, it is obviously necessary to form the case 8 from a transparent material, etc. It is clear that the compass direction indication of the compass 7 can be read not only through the lumen, but also directly from outside, due to this transparency.

MODIFIED EMBODIMENTS

Figure 7:
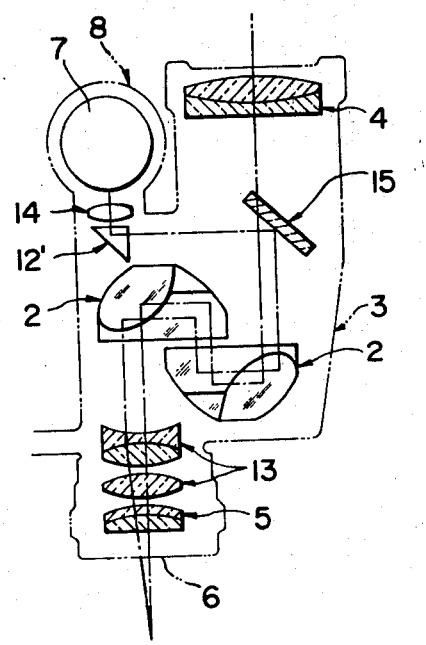
FIG. 7 is a plan view of an embodiment changing the optical path for compass direction indication of a pair of binoculars shown in FIG. 1.

FIG. 7 shows the second embodiment of the invention. Members in this embodiment marked with the same reference numeral as in the above-described embodiment show members of the same name. The characteristics of this embodiment are as follows. Instead of forming the small, rectangular prism with the Porro prism, a small, independent, rectangular prism 12' is provided behind the objective lens 14, and also a mirror body 15 is provided in the body tube 3. An image of the direction indication is formed at the focal point through an objective lens 14, the small prism 12', the mirrorbody 15, and the Porro prism 2. The image is perceived together with the image of the external view on the same plane through the oculars 13 and 5. Here, if the case 8 is made transparent, battery illumination is not required. In addition, the compass used here, an immersion compass, is identical to the compass used in the above-described embodiment.

Figure 8:
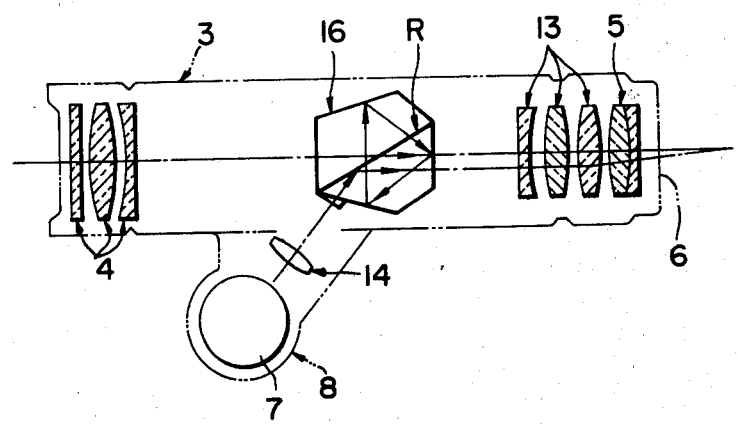
FIG. 8 is a plan view of an embodiment applying this invention to a pair of roof prism binoculars.

FIG. 8 shows the third embodiment of the invention, which is an embodiment of a pair of roof prism binoculars. Members in the FIG. 8 marked with the same reference numeral as in the above-described embodiments are members of the same name. An image of the compass direction indication obtained by an immersion type magneto-compass is formed by light reflecting from the reflecting surface R of a roof prism 16.

Figure 9:
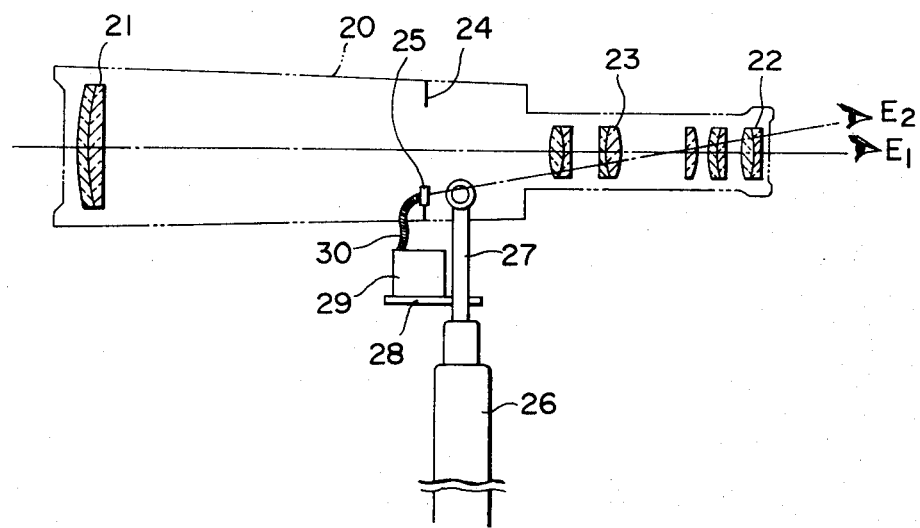
FIG. 9 is a side elevational view of a telescope on a stand.
Figure 10:
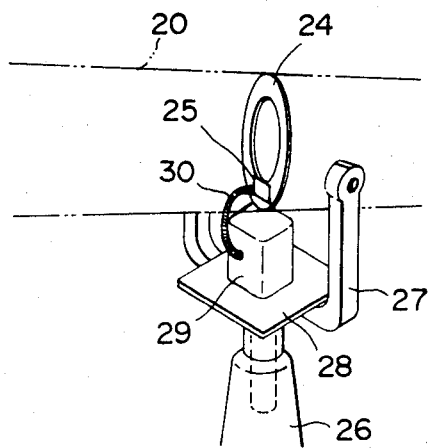
FIG. 10 is a perspective view of an arm section of a telescope on a stand.
Figure 11:
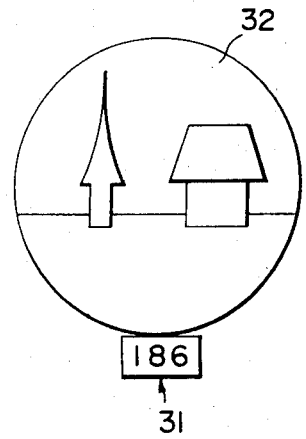
FIG. 11 is a schematic view showing the condition of compass direction indication at the periphery of the field of vision of a telescope.

FIGS. 9 and 11 in combination are explanation figures of an embodiment which applies the invention to a telescope on a stand. FIG. 10 is a partially sectioned perspective view. Referring to the figures: reference numeral 20 is a body tube of a telescope, 21 is an objective lens, 22 is an ocular, 23 is an erect optical system, 24 is a diaphragm for the field of vision, 25 is a luminious diode indication means provided at the diaphragm for the field of vision 24, 26 is a base for the telescope, 27 are arms which are supported by bearings at the base and which are attached to the body tube, 28 is a base plate fixed to the arms, 29 is a gyrocompass attached to the base plate 28, 30 is a conductor which conducts the indication signal from the gyrocompass to the luminous diode indication means 25.

In this embodiment, when the body tube 20 pivots horizontally, the arms 27 and the base plate 28 also pivot to the same angle. Then, the gyrocompass 29 attached to the base plate detects the compass direction in which the body tube is pointed, and an indication signal is sent through the conductor 30 to the luminous diode indication means 25. Thus the present direction is indicated. When the eye is at position $E_1$, the external view is perceived. However, if the eye is moved to the position $E_2$, the compass direction of the object can be obtained. More specifically, the image of the direction indication coming from the luminous diode indication means 25 through an erect lens 23 and the ocular 22 can be perceived at the periphery 31 of the field of vision of a finder 32, as illustrated in FIG. 11.

Figure 12:
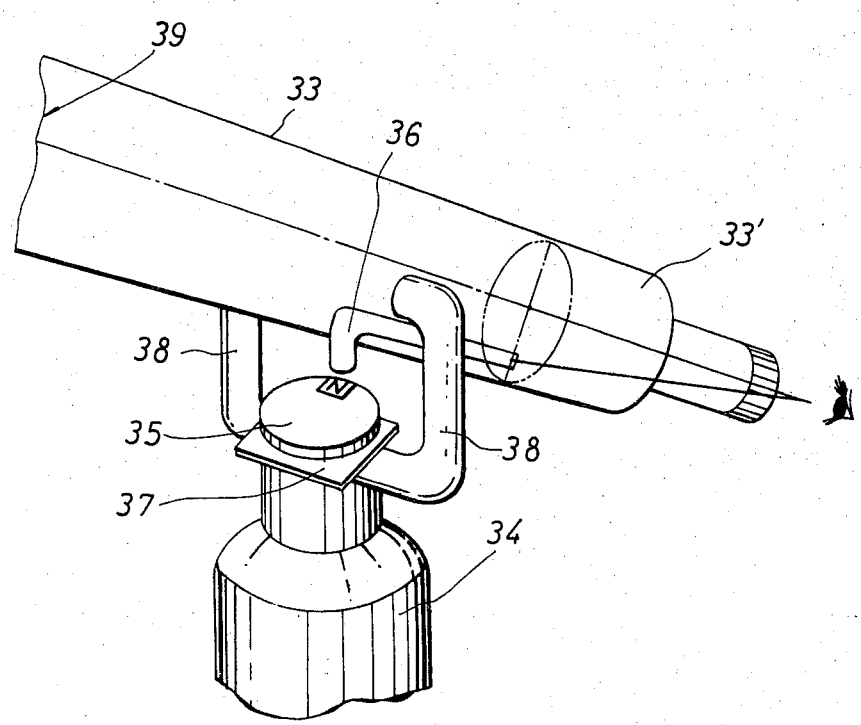
FIG. 12 is a partially perspective view of a telescope on stand.
Figure 13:
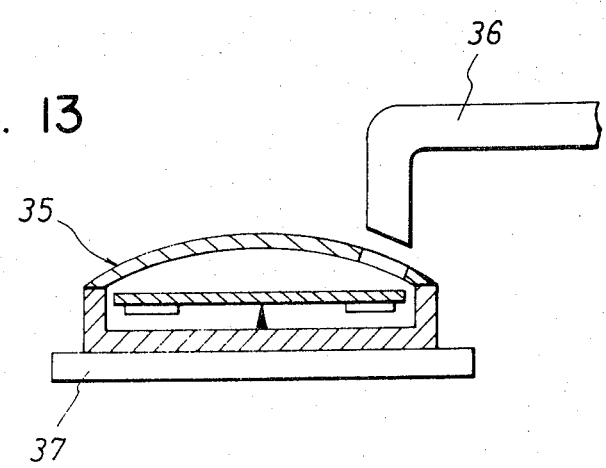
FIG. 13 is a vertically sectioned view of a disk type magneto-compass.

Another form of telescope, described in FIG. 12 and FIG. 13, is a telescope on a stand 34 which uses so-called "a disc type magneto-compass" 35 and a fiberscope 36. The magneto-compass 35 is placed on a base plate 37 fixed to arms 38,38 which move with the body tube 33 in the same direction. One end of the fiberscope 36 is positioned at the direction indicating surface of the magneto-compass 35, and the opposite end of the fiberscope 36 is positioned on the same plane as the focal point of the objective lens 39 in the body tube 33. Thus the magneto-compass 35 moves according to the direction in which the objective lens 39 of the telescope is pointed. Then the viewer can perceive the direction of the external view in the finder 33' through the fiberscope 36 from the surface of the magneto-compass 35 where the direction is indicated.

I claim:

1. A telescope having a body tube positionable in horizontal and vertical directions for obtaining a magnified image of a distant object comprising a compass having a case mounted to be positioned in directions in which the body tube of said telescope is positioned, a compass direction indicator mounted for universal movement with respect to the case in which the indicator is carried, the indicator being pendulous such that the indicator is rotatable in a horizontal direction in the case, a means for bringing into a field or periphery of a field of vision of the tube of said telescope the image of a sign of direction signal detected by and shown on said compass and directed to the tube irrespective of any angle change of the body tube in a vertical direction, and a means for observing from the same tube an image of a distant object to which said telescope is directed together with a sign of the direction indicated by said compass wherein said means for bringing in the field or periphery of the field of vision of said telescope said sign of direction which is shown on said compass and directed to the tube of said telescope comprises an objective lens set against the compass, and a small second prism pasted on the back surface of said first prism.

2. A telescope having a body tube positionable in horizontal and vertical directions for obtaining a magnified image of a distant object comprising a compass having a case mounted to be positioned in directions in which the body tube of said telescope is positioned, a compass direction indicator mounted for universal movement with respect to the case in which the indicator is carried, the indicator being pendulous such that the indicator is rotatable in a horizontal direction in the case, a means for bringing into a field or periphery of a field of vision of the tube of said telescope the image of a sign of direction signal detected by and shown on said compass and directed to the tube irrespective of any angle change of the body tube in a vertical direction, and a means for observing from the same tube an image of a distant object to which said telescope is directed together with a sign of the direction indicated by said compass wherein the telescope comprises binoculars having parallel tubes and a hinge joining the tubes and wherein the case is mounted adjacent the hinge.

3. A telescope according to claim 2, wherein said compass comprises a compass direction indicating globe on the outer surface of which the cardinal points are shown, a magnet sensing the terrestrial magnetism and disposed in said direction indicating globe, a lubricating liquid for floating said direction indicating globe, and a casing for housing said direction indicating globe and said lubricating liquid.

4. A telescope according to claim 3, wherein said telescope is sized so that it can be supported by hands.

5. A telescope according to claim 2 wherein the compass case is hinged and is connected to both tubes, part of the case is made of a transparent material.

* * * * *